(12) United States Patent
Agarwal et al.

(10) Patent No.: US 8,386,290 B2
(45) Date of Patent: Feb. 26, 2013

(54) OPTIMIZING A SHARED SERVICE DELIVERY SYSTEM

(75) Inventors: Shivali Agarwal, Ghaziabad (IN); Saeed Bagheri, Croton On Hudson, NY (US); Jarir K. Chaar, Ardsley, NY (US); Krishna C. Ratakonda, Yorktown Heights, NY (US); Vinay K. Reddy, Bangalore (IN); Bikram Sengupta, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 53 days.

(21) Appl. No.: 13/155,580

(22) Filed: Jun. 8, 2011

(65) Prior Publication Data

US 2012/0316912 A1 Dec. 13, 2012

(51) Int. Cl.
*G06Q 10/00* (2012.01)
(52) U.S. Cl. .................................... 705/7.17
(58) Field of Classification Search .................. 705/7.17
See application file for complete search history.

(56) References Cited

U.S. PATENT DOCUMENTS

| 7,467,373 | B2 | 12/2008 | Pepin et al. | |
|---|---|---|---|---|
| 2002/0082998 | A1 | 6/2002 | Sastri et al. | |
| 2002/0128895 | A1* | 9/2002 | Broderick et al. | 705/9 |
| 2006/0053046 | A1* | 3/2006 | Bonnstetter et al. | 705/11 |
| 2007/0038494 | A1 | 2/2007 | Kreitzberg et al. | |
| 2007/0198317 | A1* | 8/2007 | Harthcryde et al. | 705/8 |
| 2008/0021768 | A1 | 1/2008 | Ross | |
| 2008/0313000 | A1* | 12/2008 | Degeratu et al. | 705/8 |
| 2009/0043621 | A1* | 2/2009 | Kershaw | 705/7 |
| 2009/0234697 | A1* | 9/2009 | Taguchi | 705/9 |

FOREIGN PATENT DOCUMENTS

JP 2005321922 A2 11/2005

OTHER PUBLICATIONS

E. Hans, Phd, "Resource Loading by Branch and Price Techniques," Thesis, Beta Research School for Operations Management and Logistics, 2001, Twente University Press, Enschede, The Netherlands.
C. Basu et al., "Towards Developing a Model for Global Business Process Reengineering," Proceedings of Americas Conference on Information Systems, 1999.
J. Esteves et al., "Enterprise Resource Planning Systems Research: An Annotated Bibliography," Communications of AIS, 2001.
C. Poirier, "Forecasting, Demand Management and Capacity Planning" ASC Institute, Knowledge Library, Featured White Pages, http://www.ascinstitute.com/products_whitepapers_summary.php?id=1008.

(Continued)

*Primary Examiner* — Peter Choi
(74) *Attorney, Agent, or Firm* — John R. Pivnichny; Law Office of Jim Boice (57) ABSTRACT

A computer implemented method, system, and/or computer program product optimize a shared service delivery system. A model of an existing shared service delivery system is created. Capacity of the existing shared service delivery system is defined according to required resources for existing projects, new projects, and proposed projects. Existing cells of practitioners in the existing shared service delivery system are identified, and any gaps or gluts of capacity in the existing cells of practitioners are identified according to a general predetermined resource requirement for the shared service delivery system.

16 Claims, 6 Drawing Sheets

OTHER PUBLICATIONS

A. Deif et al., "Dynamic Capacity Planning and Modeling Its Complexity," Changeable and Reconfigurable Manufacturing Systems, Springer, 2009.

L. Liu et al., "The Contingent Effects on Project Performance of Conducting Project Reviews and Deploying Project Management Offices," IEEE Transactions on Engineering Management, vol. 54, No. 4, Nov. 2007, pp. 789-799.

G. Feng et al., "Research of Design Reuse in Complex Product Integrated Design Systems," IEEE 2010, pp. 750-754.

C. Ebert et al, "Requirements Engineering—Industry Needs," 16th IEEE International Requirements Engineering Conference, 2008, p. 298.

R. Horner, "Integrated Project Delivery, Risk and Insurance," Integrated Project Delivery Seminar Sries, 2009, pp. 1-22.

J. Colagiovanni, "Project Delivery Methods: Issues and Challenges," St. Louis Council of Construction Consumers, 2010, pp. 1-5.

C. Thomsen et al., "Managing Integrated Project Delivery," CMAA, 2010, pp. 1-105.

* cited by examiner

OPTIMIZING A SHARED SERVICE DELIVERY SYSTEM

BACKGROUND

The present disclosure relates to the field of computers, and specifically to the use of computers in the field of using resources from different systems. Still more particularly, the present disclosure relates to sharing resources between different systems.

The traditional mode of delivering Information Technology (IT) services has been through project-specific teams. A dedicated team is assigned to a project to address all (and only those) requirements that come from the end-users of that project. However, this way of organizing service delivery leads to inefficiencies due to inability to use expertise and available resources across teams in a flexible manner.

BRIEF SUMMARY

A computer implemented method, system, and/or computer program product optimizes a shared service delivery system. A model of an existing shared service delivery system is created. Capacity of the existing shared service delivery system is defined according to required resources for existing projects, new projects, and proposed projects. Existing cells of practitioners in the existing shared service delivery system are identified, and any gaps or gluts of capacity in the existing cells of practitioners are identified according to a general predetermined resource requirement for the shared service delivery system. In response to identifying a gap of capacity in the existing cell of practitioners, a recommendation is presented to create new cells of practitioners, and any existing cells are updated according to the skill set demanded by the gap of capacity. Practitioners from a bench or hiring pool of workers, having the skill set demanded by the gap of capacity can then be assigned to the new cells of practitioners. In response to identifying a glut of capacity in existing cells, the excess practitioners are identified to aid a manager in updating cells accordingly.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
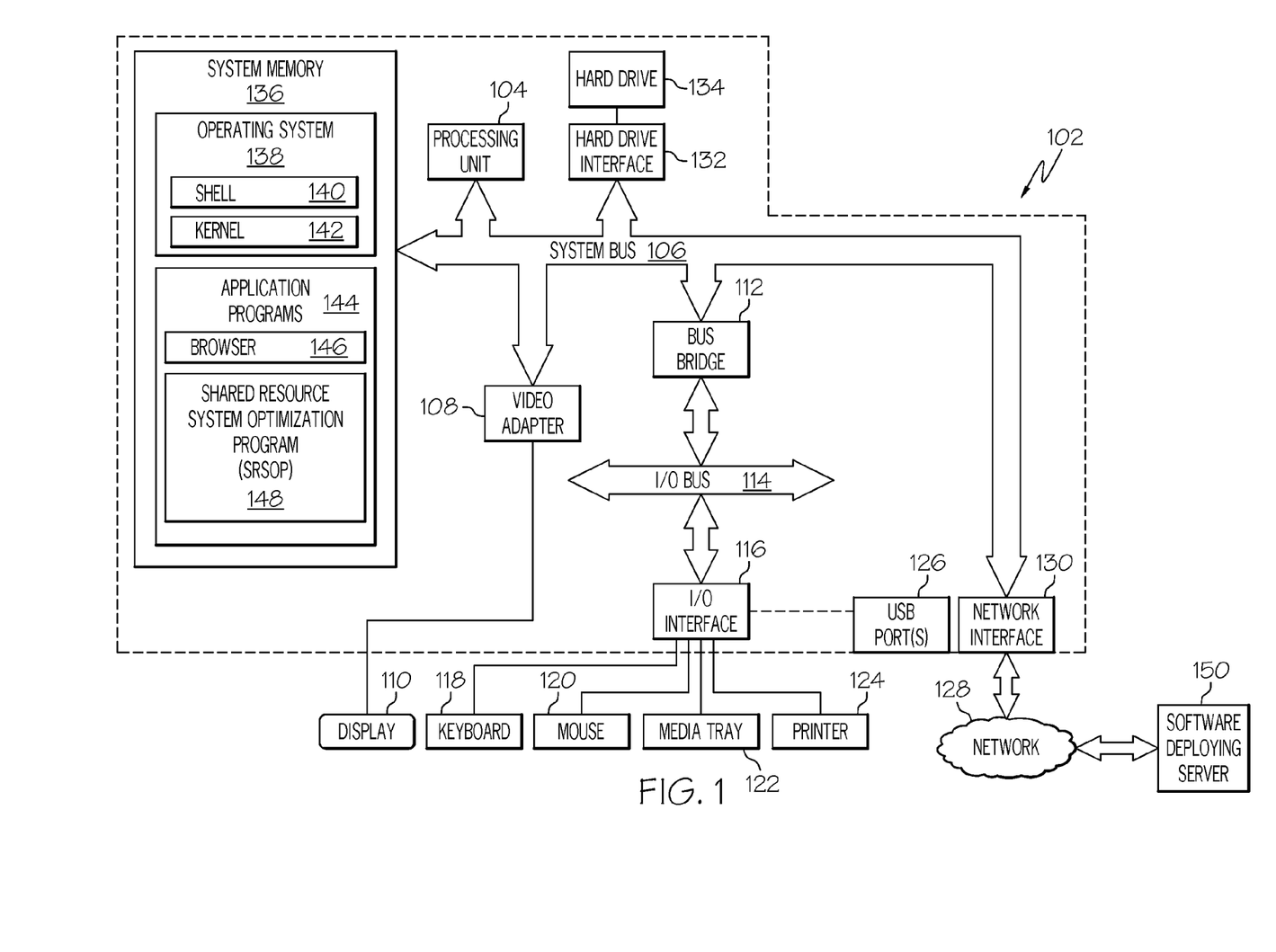
FIG. 1 depicts an exemplary computer in which the present disclosure may be implemented.

With reference now to the figures, and in particular to FIG. 1, there is depicted a block diagram of an exemplary computer 102, which may be utilized by the present invention. Note that some or all of the exemplary architecture, including both depicted hardware and software, shown for and within computer 102 may be utilized by software deploying server 150.

Computer 102 includes a processing unit 104 that is coupled to a system bus 106. Processing unit 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a shared resource system optimization program (SRSOP) 148. SRSOP 148 includes code for implementing the processes described below, including those described in FIG. 2. In one embodiment, computer 102 is able to download SRSOP 148 from software deploying server 150, including in an on-demand basis, wherein the code in SRSOP 148 is not downloaded until needed for execution to define and/or implement the improved enterprise architecture described herein. Note further that, in one embodiment of the present invention, software deploying server 150 performs all of the functions associated with the present invention (including execution of SRSOP 148), thus freeing computer 102 from having to use its own internal computing resources to execute SRSOP 148.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

The traditional mode of delivering Information Technology (IT) services has been through project-specific teams. A service vendor assigns a dedicated group of practitioners to a project to address all (and only those) requirements that come from the customer. This delivery model offers a number of advantages. First, it establishes clear boundaries that simplify the allocation and management of work. Second, practitioners become very knowledgeable about the customer's processes and systems over time, which translates to higher individual productivity and work quality. Third, practitioners also become familiar with each other's working style, strengths and weaknesses, which lets them complement one another and generate high performance as a team. Finally, the customer organization has visibility into its dedicated team and some degree of control over its operations. All these (ideally) lead to improved customer satisfaction in the long run, which, in turn helps the vendor grow its business with the customer.

These benefits notwithstanding, the dedicated delivery model also throws up several challenges for a service vendor. For example:

Capacity Management: When there is an increase in the workload in a project, it may necessitate new resources to be hired, or lead to work being refused or delayed; this may occur even as some of the other project teams may have relatively idle members during that period of time, who either have the necessary skills, or may be trained to come up to speed. Thus available capacity is not well-utilized, and it becomes difficult to scale such a delivery mechanism in a profitable manner.

Knowledge Management: Knowledge remains confined within project team boundaries, leading to missed opportunities for re-use or broader expertise gain. This, in turn, can also reduce motivation levels and encourage attrition, which significantly increases the vendor's operational costs.

To address some of these challenges, shared delivery of IT services is performed, where instead of having project-specific teams working in silos (vertically integrated team units), there are cross-project skill-based teams that can potentially service end-users from more than one project. This cross-project organization allows workers to be assigned to specialization-driven teams, which are referred to as "cells". One usage of such cells is that of an IT service delivery. For example, in an IT service delivery system, some members in a cell may primarily work on project P1, and some may work primarily on project P2, but by virtue of being part of the same team, they can share knowledge and available capacity. The composition of a cell may change from one cycle to the next, since there is no consistent project-specific tagging, and practitioners can be shifted to wherever their skills are most in need in the current cycle. The optimized model presented herein is particularly useful for domains like packaged application systems, infrastructure management etc., where a practitioner's ability to deliver a service depends mainly on his/her technical know-how of products and platforms, and where he/she can acquire customer-specific knowledge with relative ease. Such domains are also usually characterized by several distinct but related technology components (e.g., different modules of a packaged system), which make cross-training both feasible for the vendor and attractive for the worker. However, the flexibility offered by the shared delivery model can be a double-edged problematic unless handled carefully. The blurring of team boundaries can introduce an element of chaos as practitioners are moved from one project to the next to best meet current demand. Customer-specific knowledge can degrade to the point where delivery quality and productivity are impacted. The absence of a stable working group can also impact collaboration and team-spirit, thereby impeding performance. These issues can severely diminish customer satisfaction, even if the vendor is able to reduce service price to some extent through increased sharing.

Figure 2:
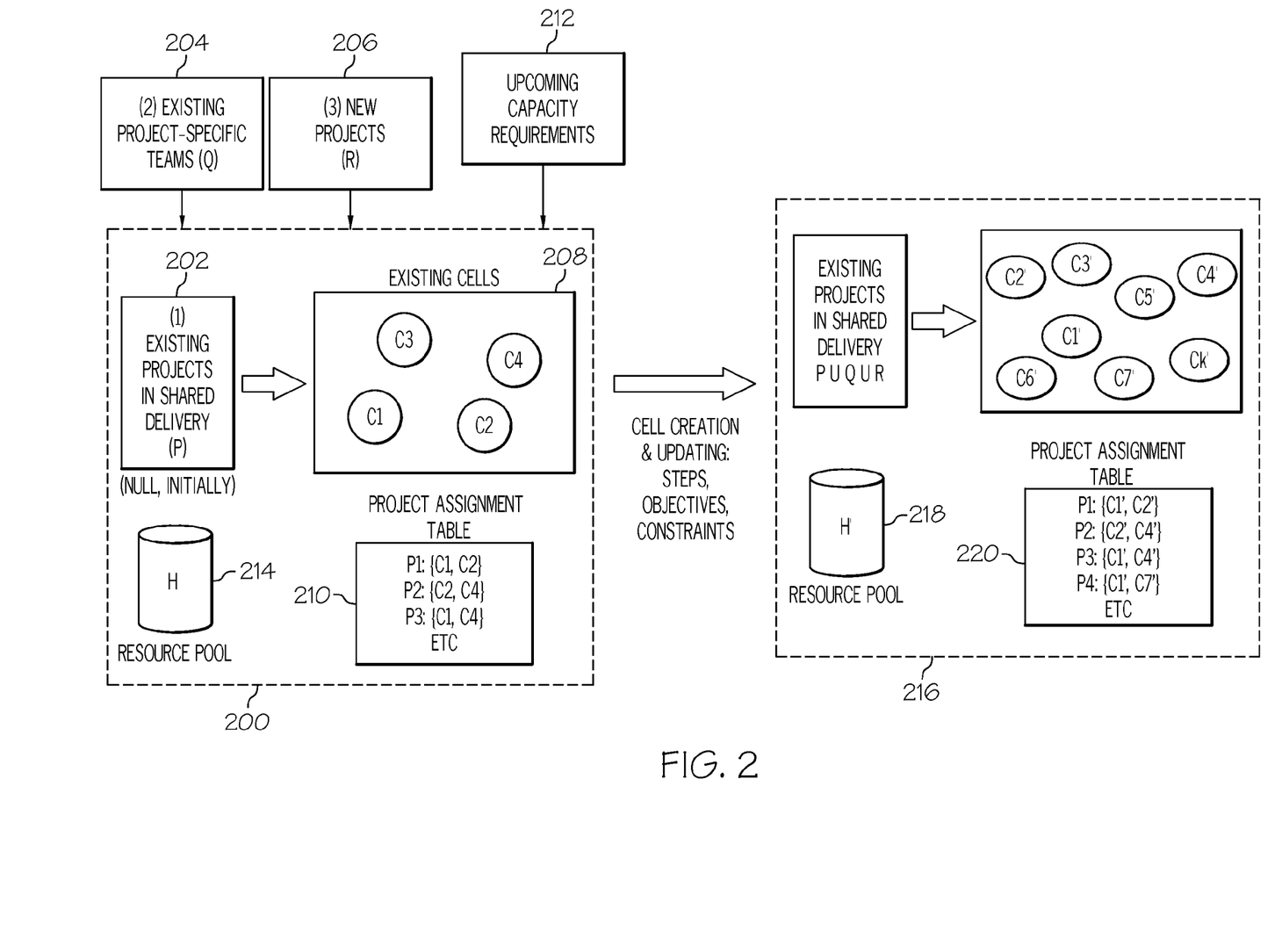
FIG. 2 illustrates an exemplary organization for shared delivery of services.

With reference now to FIG. 2, a model of a shared service delivery system, as generated by a processor in a computing system, is presented. The processor generates a model of an existing shared delivery system 200 and then creates, and generates a model of, an optimized shared service delivery system 216. Note that in the models depicted, three categories of projects can be accommodated when optimizing cells. These categories are depicted as existing projects in shared delivery (202), existing project-specific teams (204), and new projects (206).

Existing projects in shared delivery 202: These are projects that have already been moved to the shared service delivery system that utilizes existing cells 208, and are being serviced through a set of cells C1-C4 as described above. A project assignment table 210 records which project is being delivered by which cells. The project assignment table 210 can also record the relative distribution of capacity within a cell, across the projects serviced by it. Initially, there will be no project in shared delivery, so this set will be null.

Existing project-specific teams 204: These are existing project teams that need to be moved to shared delivery.

New projects 206: These are new projects the enterprise will start to deliver on, through shared delivery of services. As there is initially no existing team-member for such a project, a determination is made to see if the current cells C1-C4 can satisfy the capacity demand. If so, then a determination is made as to how these cells C1-C4 (as well as new cells) may have to be organized.

As depicted in FIG. 2, upcoming capacity requirements 212 are also input into an existing resource delivery system 200, which also includes a resource pool 214. These upcoming capacity requirements 212 include a description of capacity of the existing shared delivery system 200 that will be needed for projected (predicted) future work. Note that the resource pool 214 includes hardware, software and/or personnel workers. If there is insufficient capacity in the existing shared delivery system 200 to handle the requirements of elements 202, 204, 206, and 212, then an optimized shared service delivery system 216 is created. In case of sufficient capacity, an optimized shared service delivery system 216 is created by updating existing cells. Optimized shared service delivery system 216 is created by adding new cells C1'-Ck' (where "k" is an integer) and, and, optionally updating existing cells. Note that cells C1'-C4' are updated versions of existing cells C1-C4 found in the existing shared delivery system 200, while cells C5'-Ck' are new cells. All of the upgraded/revised/new cells C1'-Ck' utilize additional resources from the resource pool 218. The assignment record of the cells is recorded in the optimized assignment table 220.

Thus, the optimized shared service delivery system 216 is a transformed shared service delivery system that will onboard the project-specific teams and new projects by optimally updating the existing cells and creating new cells as needed. In one embodiment, this transformation occurs in two broad phases, first yielding an interim shared delivery model (Phase I), which is then optimized in the second phase (Phase II) to yield the final model.

Phase I

In Phase I, consideration is give to any capacity gaps/gluts of each type of project. If such capacity gaps/gluts are identified, then new cells are created for the projects that will be on-boarded, including existing projects in shared delivery (P) plus existing project-specific teams (Q) plus new projects (R).

Existing Projects in Shared Delivery:

Each existing project P in a shared service delivery system has a current assigned capacity of N distributed over a set of k cells C1, . . . , Ck, such that N1+N2+ . . . +Nk=N. The project P also has an estimated capacity requirement of N' for the upcoming cycle. Thus; if N'>N, then there is a capacity gap, while if N'<N, then there is a capacity glut in the team. Note that N' may be an average capacity requirement over a predefined cycle, rather than a peak capacity. Thus, the capacity N' is calculated using a time-graph of capacity requirement (e.g. at monthly level) over the planning cycle.

In cases in which there is a gap or glut of resources, then the resources are distributed across cells C1'-Ck', either uniformly or according to the needs of one or more of the projects P1-P4 depicted in the optimized assignment table 220.

If there is a gap/glut of resources needed for existing, new, and/or projected projects, then each cell Cx, for each project Px delivered by it, is given a gap/glut value. This value is described as "gap (Cx, Px)". When aggregated over all the projects delivered by the cell, the value describes a net gap/ glut for all of the cells, since a glut from one project can alleviate a gap from another project.

Existing Project-Specific Teams:

For each project, there is a currently assigned team of size N1. This team can be distributed over a ceiling (N1/Csize) of cells, where Csize is related to the acceptable size of a cell in shared delivery (e.g. Cmin, Cmax, Caverage etc.). That is, a minimum and/or maximum number of cells can be established, even though cells may share workers/resources. Thus, the number of cells are subject to one limit (minimum/maximum number of cells that are permitted) and the number of team members are subject to another limit (minimum/maximum number of workers that are permitted). In one embodiment, if a cell has less than the minimum allowable number of members, then it is considered a "sub-cell".

For example, assume that there is an estimated capacity requirement of N2 workers for the upcoming cycle, leading to a gap/glut of |N1-N2|. This gap/glut is distributed over the newly created cells (either uniformly or according to some predefined constraint, such as work experience, etc.). Each cell is labeled by its net gap/glut value distributed over the projects that have resulted in this gap/glut, thus allowing for the redistribution of the worker resources (practitioners).

New Projects:

Each new project has a capacity requirement of N workers for an upcoming cycle. This capacity requirement is distributed across a ceiling(N/Csize) of virtual cells. The size of each such virtual cell (that has no member at present) is used to label the gap value for the cell, along with the project name. Note that the last such cell may be a virtual "sub-cell" of size less than Cmin.

At the end of Phase 1, an intermediate shared service delivery system now consists of:

Existing cells (from an existing shared service delivery system such as existing shared delivery system 200) such as elements C1-C4 shown in FIG. 2, described with gap/glut information at a project-level;

Newly formed populated cells (e.g., which arose due to new or existing projects being moved to shared delivery) such as elements C1'-Ck' shown in FIG. 2, created based on the gap/glut information found in cells C1-C4;

Newly formed empty cells (e.g., cells C5'-Ck'), created in response to new projects to be moved to shared delivery; and Sub-cells resulting from new cell formation, which are smaller than a minimum acceptable cell size.

Phase II

In Phase II, the intermediate shared service delivery system is refined by applying the following actions:

Gap-Glut merge: A gap (e.g. 3(P1)) in one cell Cp may be met by gluts in other cells (e.g. 2(P2) in cell Cq and 2(P3) in cell Cr). In such cases, the gap/glut values and project assignment table are updated, such that Cp will have 0 gap, Cq will have 0 glut, Cr will have 1 glut, and P1 will also be delivered from Cq and Cr as well.

Sub-cell merge: Two (or more) sub-cells (with respective projects) may be merged to form one full cell (that will be associated with all those projects) and a sub-cell. This allows multiple sub-cells, which alone are incapable of handling a task, to merge in order to give them this capability.

Resource transfer: A set of resources delivering a project from one cell (or sub-cell) may be transferred to another cell. This transfer enables the consolidation of projects within a (small) set of cells, and allows cell sizes to be kept within any allowed bounds.

Resource hire: Additional resources may be brought into cells in the shared service delivery system from an available pool to meet capacity gaps that cannot be met by the current system (e.g., if the total gap is more than the total glut).

Resource reallocation: Some resources may be reallocated to the pool to offload redundant capacity (e.g., if the total glut is more than the total gap).

This process enables a heuristic approach to apply the above steps to progressively search (and backtrack) over a large solution space. The end-goal of the heuristic is to produce a system that meets some goals/constraints etc. of a shared service delivery system, such as:

Ensuring that the number of people in each cell working on a given project is >=N (to prevent projects getting widely dispersed);

Ensuring that each cell works on at least N1 and at most N2 projects (so that there is knowledge sharing within each cell across projects, without too much dispersion);

Ensuring that cell size is between C min and Cmax; Ensuring that the virtual capacity for a project (sum of the sizes of cells that deliver it) is comfortably more than its peak capacity requirement;

Minimizing the number of transfers of workers between cells (to help preserve team stability); and Minimizing the number of people needed to be hired (especially when a time-graph of capacity requirement is available per project).

Additional detail of an exemplary process to optimize a shared service delivery system is now presented.

In a shared delivery model, practitioners are specified by the skills they possess and the projects that they have worked on. The demands for each project arrive in the form of the number of practitioners required for each skill area and the time period for which they are needed. Such demands are assumed to arrive at fixed intervals.

Assume that an organization has a set of available practitioners who may or may not be organized into a cell-based shared delivery model. The problem solved by the present disclosure is to match the demands against the available practitioners and organize them into a cell framework in an optimal way. This includes updates in existing cells, formation of new cells, dissolution of cells in the absence of sufficient work, as well as maintaining a dynamic bench (i.e., a bench being a group of practitioners waiting to be assigned to an active cell). The main business objectives of shared delivery that act as the cornerstones of this transformation process are:

Improved practitioner utilization: Ensure utilization stays high even when individual project workloads fluctuate;

Cost reduction: Improve operating margins by reducing hiring and training costs;

Enhance worker motivation: Provide learning opportunities to practitioners thereby encouraging their technical growth;

High quality service: Ensure that the quality of service does not degrade when migrating from project-specific teams to shared delivery; and Robust delivery organization: Ensure service delivery continuity even in the face of attrition.

As described above, one embodiment of the present disclosure/invention contemplates the accommodation of three categories of projects:

(1) Existing projects in shared delivery: These are projects that have already been moved to the shared service delivery system, and are being serviced through a set of cells as described above.

(2) Existing project-specific teams: These are the existing project teams that need to be moved to a shared delivery model. Hence how to create new cells from the existing team members or re-structure existing cells are questions that need to be studied.

(3) New projects: These are new projects (new project wins) that the enterprise will start to deliver on, through shared delivery. There is no existing team-member for such a project, and thus there is a need to see if the current cells can satisfy the capacity demand, and how these cells (as well as new cells) may have to be organized.

For each category of projects above, an assumption is made that there is a capacity requirement for the upcoming cycle that is known to the enterprise. There is also an assumption that there is an existing practitioner pool outside of the shared delivery framework, from which additional resources may be hired if needed.

The end goal is to come up with transformation techniques for shared service delivery systems that will onboard the project-specific teams and new projects into a fresh or an existing shared system, as the case may be, by optimally updating the existing cells and creating new cells as needed. The first approach for the transformation process is based on modeling it as an optimization problem and the second approach is based on a heuristic design. Different transformation procedures result in system models with different characteristics. These models are studied under the effect of various kinds of capacity requirements and then they are contrasted with respect to which model may be more desirable for 1) meeting the business objectives over a period of time and also 2) flexibility provided in prioritizing the business objectives.

Description of Transformation Process

A. Shared Service Delivery System Model

Shared service delivery systems consist of cells that are formed based on skills. Each cell in the system is essentially uniform in structure and, in one embodiment, consists of up-to 8-12 practitioners. The number of cells in a system is a function of the number of projects that the shared service delivery system handles and the size of the projects. Thus, there is a bench of practitioners available to absorb the irregularities in capacity demands.

Project requirements are considered to be cycle based, where a cycle duration is fixed a priori. For example, a cycle can be fixed at 3 months, both in practice and in simulations. In one embodiment, the work packets that arrive in the system are not longer than the cycle duration. The projects that are handled in the system may belong to different customers from varying domains. The shared service delivery system is optimized at the beginning of each cycle according to the project requirements in the upcoming cycle.

The approach described herein achieves multiple shared delivery business objectives, including but not limited to:

Improved practitioner utilization: Support multiple projects from each cell, so that there is sufficient aggregate demand across the projects even in the face of project-specific fluctuations.

Cost reduction—Reduce training costs by moving skilled practitioners across projects whenever needed. Reduce hiring costs by re-training existing practitioners in new skills.

Enhance worker motivation—Utilize workload fluctuations to expose practitioners to new projects and skills, thereby also enhancing their motivation levels and reducing chances of attrition.

High quality service: Ensure availability of skilled practitioners for each project. Build project knowledge by retaining practitioners in a project across multiple cycles. Provide stability and familiarity by teaming up practitioners who have worked together in the past.

Robust delivery: Develop a strong bench which by virtue of good rotation policy is immediately productive. A good rotation policy should ensure that a practitioner does not get tied to a single project and acquires domain knowledge relevant for the projects being handled by the enterprise. Regular skills training is also important to get multi-skilled practitioners.

Figure 3:
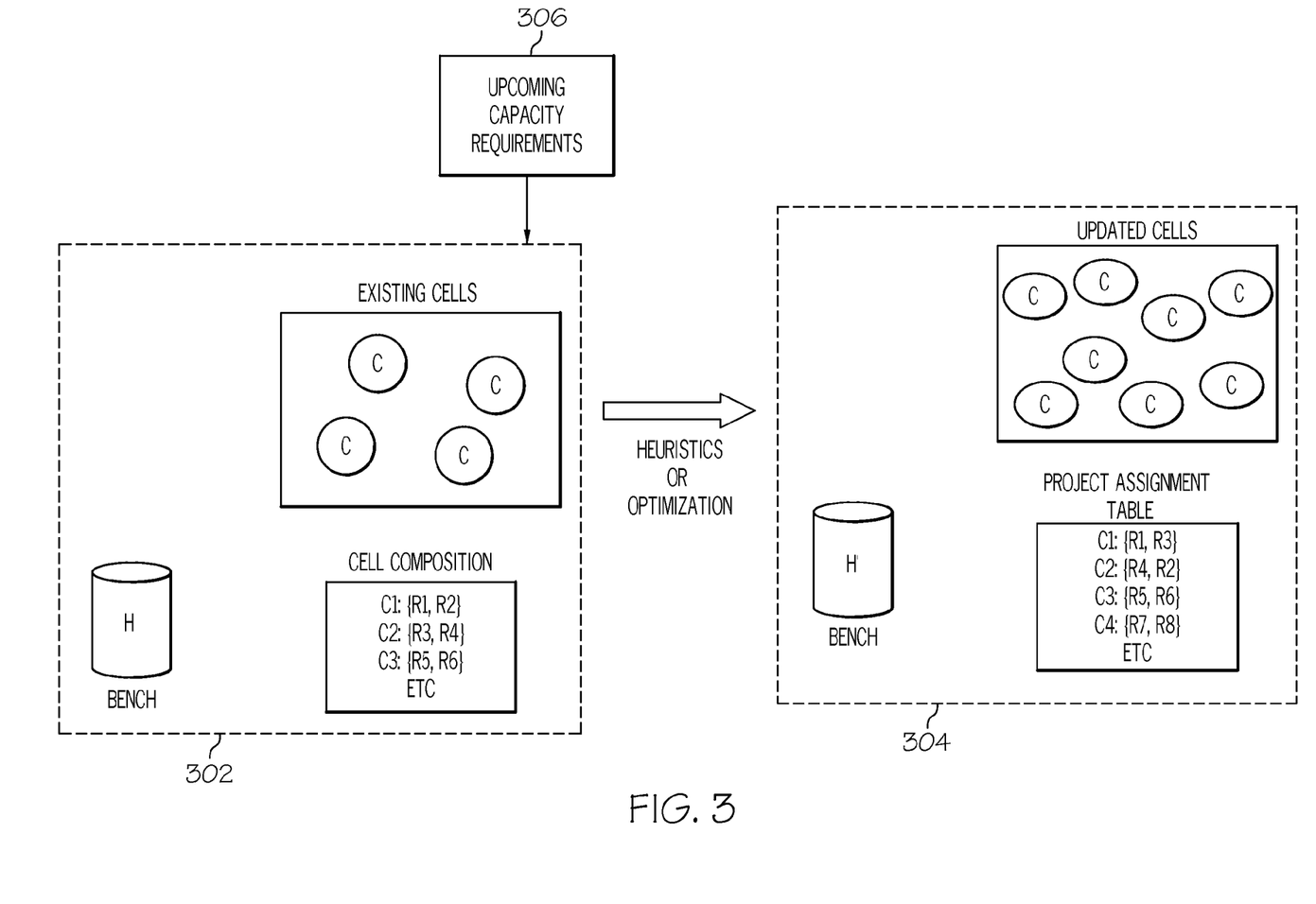
FIG. 3 depicts a simplified version of FIG. 2.

An ideal design of shared service delivery systems should meet all of the above objectives. However, since some of them are inherently conflicting, it is possible to arrive at different designs such that each one has a bias towards certain objectives. Thus, the present invention includes a heuristic based method as well as an optimization based method for organizing shared delivery. The transformation process is depicted in FIG. 3, which presents a simplified version of the process of optimizing a shared service delivery system through the use of updated cells. As in FIG. 2, existing cells from an existing shared service delivery system 302 are updated in an optimized delivery system 304 in response to anticipated upcoming capacity requirements 306, which may be from existing, new, and/or projected projects.

In both methods of transformation (modeling as an optimization problem and the heuristic design), there is modeling of capacity requirements.

B. Modeling Capacity Requirements

Capacity requirements arrive every cycle from three potential sources: (i) existing projects already being serviced by shared delivery, (ii) existing projects to be onboarded on to the shared delivery and (iii) new projects to be onboarded to the shared delivery. In addition to capacity requirements, new capacity may also get added to the system in the case where existing project specific teams are onboarded to a shared service delivery system.

The requirements are modeled in terms of a 3-tuple <skill, project-id, no. of practitioners> that denotes the number of practitioners of a particular skill type that are required for the project denoted by project-id. Every cycle has a list of such requirements in the form of tuples which need to be fulfilled from the available pool of practitioners in the system and through hiring in case of shortage. In one embodiment, the requirements are not permitted to span multiple cycles. The practitioners that get onboarded into the system are projected as available. It is up to the transformation process regarding how these new practitioners are allocated work based on their skill and experience. Once the capacity requirements are taken care of in the shared system, the projects are said to be onboarded.

C. Modeling Project Experience and Team Familiarity

In addition to the skills possessed by a practitioner, domain knowledge and familiarity with business processes of a project also play a role in deciding the work assignment. A project affinity function tracks the projects that a practitioner has most recently worked on and for how long. This function is used by the transformation processes to satisfy the objective of improving the overall quality of delivery.

Thus, let r denote a practitioner, let p denote the set of projects in the system, and let c denote a cycle. Then the function $affr(p,c)$ denotes the project affinity of practitioner r with project p∈p in cycle c. Let UB denote the upper bound value that this function can take and LB denote the value that a practitioner is initialized with. Then let $c1, c2 \ldots cn$ denote the individual cycles in increasing order such that c1 is the cycle where the project p was first assigned to the practitioner r. Then, affr(p,c1)=LB and for any cycle ci>c1 where p is assigned to r, the affinity increases as follows:

$$affr(p, ci) = affr(p, ci-1) + 20, \text{ if } affr(p, ci-1) < UB$$
$$= UB, \text{ otherwise}$$

When p is assigned to r in ci, then the affinity for the rest of the projects p' that the practitioner has worked on in the past diminishes as follows:

$$affr(p', ci) = affr(p', ci-1) - 20, \text{ if } affr(p, ci-1) > LB$$
$$= LB, \text{ otherwise}$$

Stability, achieved by reducing shuffling of practitioners between cells, is another factor to consider while assigning work. This is a function of the type of requirements that come in each cycle, but a transformation technique should try to minimize the shuffling that does not benefit any objective. Thus, a function called a familiarity index is used to measure the amount of shuffling that happens every cycle. The system is considered as a fully connected weighted graph where the nodes represent practitioners, and an edge weight denotes the number of times that the two nodes (practitioners) have worked in same team. The weight, also called familiarity score, is incremented whenever two practitioners get paired in same team. The weight is never decremented; however it can be offset/negated by a contempt index based on ineffective past work experiences that resulted from two particular practitioners being paired on previous projects. Familiarity Index of a cell is defined as the average number of times that each member of that cell has worked with one another. Let E denote the edges in the subgraph formed by the practitioners in a cell denoted by $\theta$. Let w(e) where e∈E, denote weight of e. The familiarity index of this cell, denoted f($\theta$), is given by:

$$f(\theta) = \sum_{e \in E} w(e)/|E|$$

D. Optimization Based Approach

An optimization based method organizes shared delivery, such that the practitioner assignment and the cell composition in each cycle is driven by a set of objectives that can be prioritized to map to the most important business objective to be met in that cycle.

In this approach, the number of cells and the practitioners that form a cell change from one cycle to another. After every cycle, all the practitioners are assumed to be available to service the set of project requirements in the next cycle. The fundamental property of this system is that all the practitioners are considered as one global pool. Thus, in each cycle when the new project requirements come, the practitioners from the global pool are matched against the project requirements and are optimally assigned a project for that cycle.

In one embodiment, the optimization model for the system is as follows. The inputs to the model are: the available practitioner details for the cycle; the capacity requirement information for the cycle; and the number of cells of max size 8 of each skill type (computed based on the requirement) that will exist in that cycle. Note that each requirement tuple translates into as many requests as the number of practitioners mentioned in the tuple. The practitioner details include a count of the cycles that the practitioner has been contiguously active for, which are called activeCycleCount. The number of cells in a cycle is a function of the number of requirements in the cycle and the cells are formed based on skills. The optimization model is solved to give (i) the practitioner assignment, that is, which practitioner should be assigned against which requirement, and (ii) the cell assignment, that is, which practitioner should go to which cell.

Model Parameters

Exemplary model parameters for optimizing the shared service delivery system are:
Let N denote the number of available practitioners in a cycle,
Let M denote the number of capacity requests in a cycle, and
Let C denote the number of cells in a cycle, such that
forall i:1 ... M, j: 1 ... N, define matched(i, j) as:
  matched (i, j)=1, if ith request is met by jth practitioner
  =0, otherwise
forall j: 1 ... N, k:1 ... C, define assigned(j, k) as:
  assigned (j, k)=1, if jth practitioner sent to kth cell
  =0, otherwise Constraints Exemplary constraints for the system include:
Match a practitioner and a request on skill, formalized as:
  forall i:1 ... M, j: 1 ... N, matched (i, j)<=1, if skills match
  =0, o/w
Each practitioner can satisfy at most one request, such that:
  $\Sigma$ matched (i, j)<=1 forall i:1 ... M
  j:1 ... N
Each request has to be satisfied by at most one practitioner, such that:
  $\Sigma$ matched (i, j)<=1 forall j:1 ... N
  i:1 ... M
Each practitioner can be assigned to at most one cell, such that:
  forall j:1 ... N, k: 1 ... C, assigned (j, k)<=1, if skills match
  =0, o/w
Each cell can contain at most 8 practitioners, such that:
  $\Sigma$ assigned (j, k)<=8 forall k:1 ... C
  j:1 ... N Objectives Given the above constraints, the model should be solved for certain objectives that map to the shared service delivery system design objectives. The following objectives are given in an order of priority that leads closest to the desired design.

(a) Maximize the number of skill matches in mapping practitioners to the requirements:
  maximize ($\Sigma$ matched (i, j)) where i:1 ... M, j:1 ... N
This corresponds to the business objective of reducing training costs and delivering high quality services.

(b) Minimize the number of contiguous busy cycles for each practitioner to enable idle practitioners get work:
  minimize (max(activeCycleCount(j)) where j:1 ... N
This is a load balance objective. This helps in bench rotation leading to better practitioner utilization and satisfaction, and induces robustness in the system.

(c) Maximize the number of experienced practitioners for each project while meeting the skill match requirements.
  maximize($\Sigma$(affj(pi,c)*matched (i, j)))
  where pi denotes the project to which request i belongs
This implies efficient organization and also helps in good quality delivery.

(d) Maximize the familiarity index of teams.
  maximize(sum(f($\theta$))) where $\theta$: 1 ... C
This corresponds to the business objective of high quality delivery through stable teams.

The practitioners are assigned a project according to the solution of the optimization model described above, and the cells are also formed accordingly. The solution does random assignment of practitioners to cells for each skill, thus ensuring that a cell does not end up being project-specific. If there are some unmatched requirements after solving the model, then the pool is checked for available practitioners. If there are available practitioners in the pool, then they are picked and assigned to an appropriate cell to meet the requirement after the required skill training is administered. The remaining available practitioners move to the bench (cohort of practitioners). In the event of demand overshooting the available practitioners, new practitioners are hired such that they have the required skills and are directly absorbed in the appropriate cells. If the existing cells already contain the maximum permissible number of practitioners, then a new cell is formed containing the practitioners. Note that the newly hired practitioners will become a part of the available pool in the next cycle. The project affinity, familiarity edge weights and the activeCycleCount are appropriately updated to be consumed by the next cycle.

The objectives are prioritized according to the needs of the most important business objectives and the model is solved for each of these objectives incrementally starting with the highest priority objective. This makes it a very flexible approach. Note that in shared service delivery systems, skill is the primary parameter and project knowledge is secondary for a match. This is because the number of actual work packets in a cycle for each project can deviate from the initial prediction. In case of less inflow of work in a project, a practitioner can take up the work of some other project which may have greater inflow of work, requiring that skill, than predicted, thereby, balancing out the utilization. This is only possible because of the common set of skills and the similarity of work packets that is the underlying assumption for such shared service delivery systems.

E. Heuristic Based Approach

A multi-objective optimization model may suffer from degraded values of objectives that come later in the priority. This necessitates the design of an alternative heuristic model that does relatively well in all the objectives.

In one embodiment, in a heuristic model, the team structure made available at the end of each cycle is retained and used as the primary source for the allocation of next cycle requests. Bench is the secondary source in this model. It may be noted that for the very first cycle, there will not be any existing teams. Hence, for the first cycle, it is similar to the optimization approach where a global pool of practitioners are assumed and organized into different teams. But once a team structure is generated, it is not dissolved, but retained across cycles. These teams, however, may evolve depending on the incoming request flow across cycles. For example: practitioners might be exchanged to other teams, released to bench, new hires may be added, etc.

Each request is characterized by the 3-tuple <skill, project-id, no. of practitioners>. To ensure that this approach does not lead to project specific teams during the processing, requests are intermixed across projects before allocation in each and every cycle. For example, if r1:<C,p1,4>, r2:<C,p1,4>, r3:<C,p2,4>, r4:<C, p2,4> are the incoming requests, they will be intermixed to arrive at a sequence of r1, r3, r2, r4. Also, if a request is beyond half of maximum cell size, it will be divided into sub requests (half the cell size) to ensure that a cell is not booked completely for a single project. For example: <C,p1,7> is broken into <C,p1,4> and <C,p1,3>.

The request allocation is done in three phases as described below. Note that since the first cycle does not have any existing teams, allocation starts from the second phase directly. The algorithm for each phase is described succinctly in the following pseudocode:

procedure allocateRequestsToCells(requests, cells)
    //requests are the complete set of demands in the cycle
    //cells are the existing teams
    for each request (s,p,num)
        //s is skill needed
        //p is proj required
        //num is the no of practitioners required
    (1) Traverse the cells for practitioners who match with skill s and project p while num>0
        (a) For a match found, allocate the matched practitioner to the respective cell temporarily and decrement num by 1.
    (2) If request is not satisfied completely, label it as gap and add to the list of gaps end for
    transfer the unassigned practitioners to bench
end allocateRequestsToCells procedure allocateGapsToCells(gaps, cells)
    //gaps are the partial requests
    //cells are the partial updated teams
    for each gap (s,p, num)
        //s is skill needed
        //p is proj required
        //num is the no of practitioners required after first phase
    (1) Select practitioners from bench who match with skill s and project p; if not available, ignore project p and select practitioners who match with skill s alone; if still not available, ignore project p and skill s and select; if still not available, hire practitioners to satisfy gap
    (2) Select cells which have been allocated so far for this project p
    (3) Sort the selected practitioners on a familiarity score with respect to cells identified in step 2 and allocate temporarily while num>0. Decrement num by 1 for each allocation.
    (4) If no cells are found in step 2 or if cells found are allocated as per the permissible limit, select remaining cells in the system and go to step 3
    (5) If all cells are covered and num>0, create a new cell of size<=8 for these practitioners and add it to the existing list of cells (which is empty in first cycle)
    end for
    mark the temporary assignments permanent
end allocateGapsToCells procedure swapPractitioners(cells,bench)
//cells at the end of allocation
//bench at the end of allocation
    (1) Traverse the list of bench practitioners and compare each bench practitioner with those in the cells on active cycle count and skill set (each practitioner maintains a counter to keep track of the number of cycles it is kept busy)
        (a) If (cell practitioner's active cycle count−bench practitioner's active cycle count >=2), swap practitioners
end swapPractitioners Thus, in the embodiment described in the pseudocode presented above, the heuristic based approach proceeds through the following three phases:

1) First Phase (allocateRequestsToCells)

For each request, the cells are searched for practitioners that have a match with both project and skill. This heuristic ensures that the training costs are kept to minimum and also improves the project affinity of a practitioner. Matched practitioners will be allocated (temporarily) to the respective cells adhering to the maximum permissible practitioner count constraint.

Each unsatisfied portion of a request is treated as a gap (characterized by a 3-tuple <skill, project-id, no. of practitioners> like a request) and carried to the next phase. All unused practitioners in the cells are moved to bench intermediately and the second phase starts allocating these gaps to bench practitioners.

2) Second Phase (allocateGapsToCells)

For each gap, practitioners are selected from the bench and ranked in the following priority of matching order: (i) match both project and skill, (ii) match only skill ignoring project, (iii) ignore both project and skill. If the gap is still unsatisfied, external hiring is done to satisfy the gap. This ranking is important to reduce training costs and increase project affinity.

The next step is to assign cells to the selected practitioners. For each selected practitioner, the cells containing practitioners (temporarily allocated) matched to the same project, as in the gap, are considered first. If no matching cells are found or cells are filled to capacity, then remaining cells in the system are considered. Required numbers, as per the gap, of selected practitioners are picked in ranked order and all the cells found above are sorted on familiarity score with respect to these practitioners. Each practitioner is allocated (temporarily) the cell with the highest score. This heuristic of sorting cells on familiarity ensures that each practitioner is allocated to the cell which has highest number of team members familiar to him/her.

If no cells are found from the first phase (as in the case of a first cycle), or when matched practitioners meant to fill the gap are left out even after considering all the cells, new cells are created to allocate these practitioners. After servicing all the gaps, temporary assignments are made permanent and project affinity, familiarity edge weights and activeCycleCount values are updated appropriately. At the end of second phase, all gaps would be served and all cells will be populated with the appropriate set of practitioners.

3) Third Phase (swapPractitioners)

To ensure there is effective bench rotation, idle bench practitioners (practitioners who have been idle on bench for longer periods) are identified and exchanged with active cell practitioners (practitioners that have been in cells for longer periods) having matching skills at the end of each cycle.

Evaluation of the Two Approaches

The two approaches (Optimization Based and Heuristic Based) described above for organizing shared delivery are evaluated to provide insights into the following questions:

How do they fare individually when subjected to different demand patterns? How well are they able to satisfy the business objectives?

How does the optimization based approach fare against the heuristic based approach?

Several metrics are now presented to aid in the understanding of the advantages of each approach. In order to test these metrics and the approaches, a simulation has been carried out with various types of input patterns to measure these metrics using a constraint programming software engine.

A. Design of Input

Figure 4:
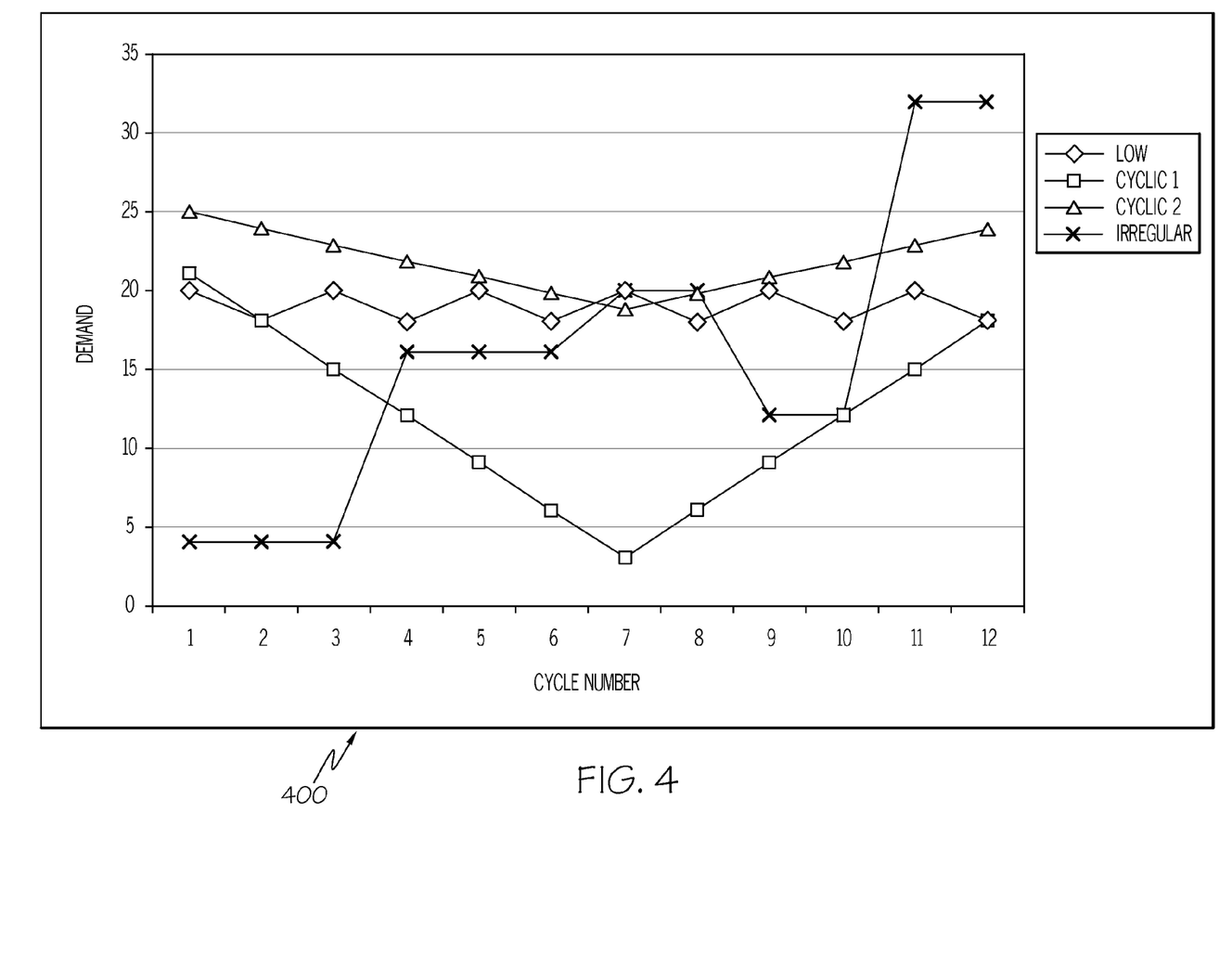
FIG. 4 depicts a skill distribution pattern from an experimental implementation of the present invention.

The projects are specified with the skills that they need and practitioners are specified with the skills that they possess. A simulation of the system spans several cycles and the demand for practitioners in each cycle is varied on two dimensions: 1) total demand aggregated over all projects, 2) distribution of the total demand between skills. The total demand in each cycle varies between 0-15% (increase or decrease) from the total number of practitioners in the system. The distribution of demand over the skills is done as per one of the patterns shown in graph 400 in FIG. 4. The patterns are designed to capture a very low perturbation to a very irregular kind of perturbation. A perturbation is defined as the difference in demand for a skill between two consecutive cycles. The difference between cyclic1 and cyclic2 is the scale of perturbation for the same kind of periodic variation.

Figure 5:
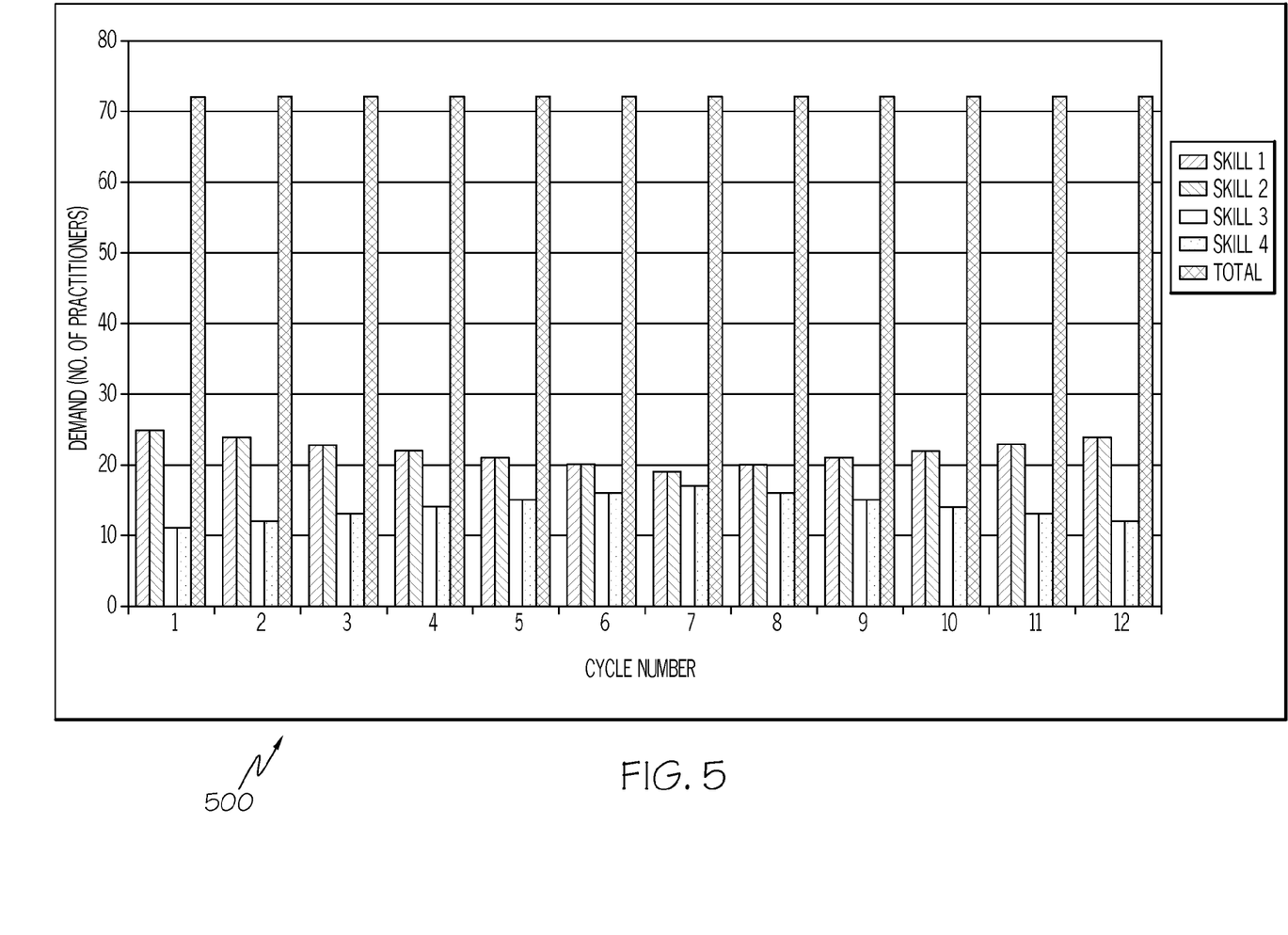
FIG. 5 illustrates a demand distribution from an experimental implementation of the present invention.

Graph 500 in FIG. 5 shows an example of the demands generated for four skill types following cyclic2 pattern and having zero variation in total demand.

The basic purpose of designing the various patterns is to observe the evolution of the system under varying proportions of perturbation in demand. Each of the patterns shown in FIG. 4 will result in highlighting certain aspects of the shared system design when simulated over many cycles.

B. Design of Metrics

The metrics used for measuring the two approaches against the business objectives are described below.

1) Training costs: This metric capture the total number of practitioners that had to be trained in every cycle. This is directly proportional to the actual costs incurred by the system. This also indicates how well equipped the system is to give quality delivery in the presence of changing demand trends.

2) Practitioner utilization: This metric captures the average ratio of the number of cycles for which a practitioner was busy to the number of cycles for which he was present in the system. Computing the standard deviation of this value for the practitioners provides a sense of load balancing. High utilization indicates low operating costs, good bench rotation policies and practitioner satisfaction.

3) Project affinity: This metric is cycle based and captures the average affinity value for a project in a cycle c. For each cycle, an average affinity is computed for each project p by first summing up the values of affr(p,c) for the practitioners that are working on project p in that cycle and then taking an average. Then, an average of these values is taken to give the desired metric. High values of this metric have a positive impact on quality delivery objectives.

4) Familiarity Index: The metric measures the average familiarity index value for the cells present in the system and a high value indicates a stable team while a low value indicates a high amount of shuffling.

5) Average number of skills acquired by a practitioner: As a result of training, practitioners acquire with more than one skill by the end of the simulation cycle. A higher average number of acquired skills indicates a good policy of practitioner development, thus higher worker motivation and system robustness.

6) Average number of projects worked on by a practitioner: This denotes the average number of projects that the practitioner got a chance to work on and is indicative of the domain knowledge spread in the system. A higher value indicates better system health and less attrition.

7) Average number of projects per cell: This metric captures how many projects a cell handles on average in each cycle. This is the core differentiator of shared delivery from a project-specific model.

C. Experimental Use Case

In one embodiment of the present invention, experimental simulation is run for 12 cycles which amounts to a span of 3 years given an assumption that a cycle consists of 3 months. During this time period, the number of practitioners in the system increases as a consequence of hiring and onboarding existing project teams. The demands are generated for 4 projects (mix of new and existing) with up to 4 skills each for the 12 cycles according to the total demand and distribution patterns previously explained. Specifically, the input types used for simulation are:

Type I: All skills follow the pattern of low perturbation;
Type II: All skills have cyclic1 distribution;
Type III: All skills have cyclic2 distribution with no variation in total demand (illustrated in FIG. 5); and
Type IV: All skills have irregular distribution such that the total demand is not off by more than 15% of the total practitioners in each cycle.

Note that the patterns have been mixed in each type to ensure that there are no large variations in total demand; rather, an adequate type of perturbations for each skill demand is present.

The results of the simulation runs for all the four input types are presented in Table I and Table II shown below. The training cost is shown as aggregated values over 12 cycles; project affinity, familiarity index, and utilization are shown as values normalized over ideal values averaged over 12 cycles, while the skills acquired and projects worked are shown on an average. Table II contains the standard deviation values of utilization, projects worked, and skills acquired.

TABLE I

HEURISTIC (H) VS. OPTIMIZATION (O) MODEL

| Metric | Type I | | Type II | | Type III | | Type IV | |
|---|---|---|---|---|---|---|---|---|
| | H | O | H | O | H | O | H | O |
| Trng. Costs | 0 | 0 | 50 | 40 | 26 | 15 | 55 | 50 |
| Avg. Util. | 0.92 | 0.92 | 0.95 | 0.97 | 1.0 | 1.0 | 0.96 | 0.96 |
| Proj. Aff. | 0.88 | 0.78 | 0.78 | 0.32 | 0.70 | 0.39 | 0.89 | 0.49 |
| Fam. Index | 0.71 | 0.26 | 0.53 | 0.18 | 0.63 | 0.23 | 0.57 | 0.21 |
| Avg Skills | 1.0 | 1.0 | 1.71 | 1.57 | 1.36 | 1.20 | 1.87 | 1.79 |
| Avg. Proj. | 1.09 | 1.93 | 1.24 | 3.37 | 1.75 | 3.48 | 1.17 | 3.2 |
| Avg. proj per cell | 2.34 | 2.69 | 2.94 | 2.84 | 2.46 | 2.8 | 3.06 | 2.75 |

TABLE II

STANDARD DEVIATION (SD) METRICS

| Metric | Type I | | Type II | | Type III | | Type IV | |
|---|---|---|---|---|---|---|---|---|
| | H | O | H | O | H | O | H | O |
| Util SD | 0.11 | 0.15 | 0.08 | 0.05 | 0.0 | 0.0 | 0.07 | 0.07 |
| Skill SD | 0.0 | 0.0 | 0.48 | 0.49 | 0.56 | 0.40 | 0.45 | 0.44 |
| Proj SD | 0.29 | 0.93 | 0.46 | 0.70 | 0.49 | 0.55 | 0.41 | 0.69 |

Costs: The type I input has 0 training costs because the demands are much less perturbed across cycles and therefore the practitioner skills built early on in the system are able to handle all the demands in latter cycles. The training costs increase as the demand for each skill is perturbed across cycles as observed in the other types. This is because the requirement of one skill may go up while the requirement of another skill goes down. Analyzing each of the individual approaches for training costs, it is observed that the optimization approach results in more optimal training counts for all the perturbation types while the heuristic approach lags slightly behind. However, this difference is less pronounced if the system has skill types that are less specialized.

Utilization: The practitioner utilization (bench rotation) is almost the same in both of the approaches and is near optimal. The optimal values were computed based on the total demand in each cycle. This resulted in good results with other input data (not shown) that had high variations in demand of the order of 0-80%.

Both the approaches (heuristic and optimization) are designed to cater to the first four metrics in Table I. The next two metrics measure how the two approaches implicitly take care of knowledge spread and practitioner satisfaction in the system.

Practitioner Satisfaction and System Robustness: The heuristic approach leads to a system which has a relatively greater number of multi-skilled practitioners at the cost of increased training costs, while the optimization approach leads to a system where domain knowledge is relatively better spread among practitioners at the cost of decreased stability.

Design Flexibility: Additional experiments, in one embodiment, to study the flexibility of optimization approaches, revealed that making project affinity the primary objective and training costs the secondary objective resulted in the value of project affinity coming to the normalized value of 0.74 (more than double) and the training costs rising significantly, all with utilization at 0.96 for input type II. The re-ordering of objectives in the optimization approach effectively changes the system characteristics as desired, thus making this approach a very flexible one.

While the optimization based model is best suited for cost reduction and robustness objectives, the heuristic approach is oriented towards efficient project and team management. Thus, there is a conclusion that the heuristic approach has an advantage of being more balanced in meeting all the objectives in moderation and the optimization approach has the advantage of being flexible in choosing the primary objective and doing well with respect to the primary objectives. An enterprise that wants to operate in shared delivery mode can choose the more relevant model.

The present disclosure alleviates the lack of scientific methods for organizing shared delivery. In particular, the present disclosure presents an optimization based and a heuristics based technique to advise an organization on how it can transform itself from project-specific delivery to shared delivery and then maintain it in an optimal manner. One advantage of the present disclosure is that it retains the advantages of stable project-specific teams (customer knowledge, team-member familiarity), even as it allows team compositions to change from cycle to cycle, to leverage the benefits of sharing. Thus, the balance of these two (conflicting) forces establishes the eventual success of a shared delivery model. As such, the present invention provides the following features and benefits not found in the prior art:

Improved practitioner utilization: Ensure utilization stays high even when individual project workloads fluctuate;

Cost reduction: Improve operating margins by reducing hiring and training costs;

Enhance worker motivation: Provide learning opportunities to practitioners thereby encouraging their technical growth;

High quality service: Ensure that the quality of service does not degrade when migrating from project-specific teams to shared delivery; and Robust delivery organization: Ensure service delivery continuity even in the face of attrition.

As described herein, the present invention utilizes a framework to model business objectives for the optimal shared service delivery systems in a manner that combines the advantages of the project specific delivery systems with those of shared service delivery systems, while meeting capacity requirements for new and existing projects in a unified manner.

An optimization based methodology meets business objectives by satisfying the capacity requirements using existing practitioners as much as possible, ensuring minimization of training and hiring costs while maximizing utilization of a practitioner's domain knowledge. The optimization based methodology creates cells according to the demands for each skill type and then assign practitioners to these cells such that the business objectives of a stable and robust system are met.

Figure 6:
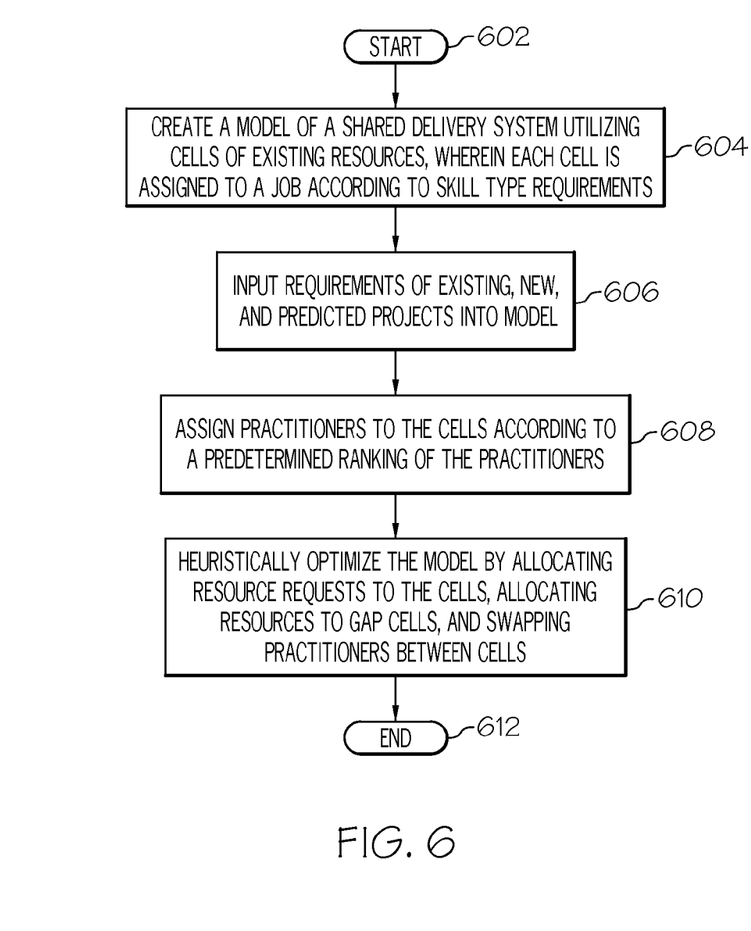
FIG. 6 is a high level flow chart of one or more exemplary steps performed by a processor to organize and optimize a shared service delivery system.

With reference now to FIG. 6, a high level flow chart of one or more exemplary steps performed by a processor to organize and optimize a shared service delivery system is presented. After initiator block 602, a model of an existing shared service delivery system is created (block 604). The model depicts cells of existing resources, where each cell is assigned to a job according to skill type requirements. Thus, existing cells of practitioners in the existing shared delivery system are duly identified and depicted in the created model.

As described in block 606, requirements of existing, new, and predicted projects are input into the model. These inputs result in a definition of a capacity of the existing shared resource delivery system according to required resources for the existing, new, and proposed projects. Any difference between the project requirements and system capacity is used to identify any gaps (lack of needed practitioners) or gluts (excess number of practitioners) in any of the cells according to a general predetermined resource requirement for the existing shared service delivery system.

As described in block 608, in response to identifying a gap in capacity in the existing cell of practitioners, a new cell of practitioners is created (in one embodiment, in response to a recommendation message from a computing system that created the model and/or identified the gap) according to a skill set demanded by the gap in capacity. This new cell (or alternatively, an upgraded previously existing cell) will contain the general resource requirements (i.e., will contain practitioners having the requisite skill sets) needed by the existing, new, and proposed (future) projects. The cells can be filled according to a predetermined ranking of the practitioners (i.e., according to the skills sets, availability, previous collaboration history with other practitioners, etc.).

As described in block 610, the model of the existing shared service delivery system is thus optimized by allocating practitioners and other resources to cells, through initial allocation of new practitioners/resources, reallocating practitioners/resources from one cell to another, and/or by allocating particular (existing, new, proposed/predicted) projects to particular cells. The process ends at terminator block 612.

A heuristics based methodology described herein provides a methodology to organize shared service delivery systems that meet the required business objectives by satisfying the capacity requirements using existing practitioners as much as possible, ensuring a minimization of the training and hiring costs and a maximization of utilization of a practitioner's domain knowledge. This is achieved by assigning practitioners to existing cells in a manner that causes minimal disturbance to existing cell structure; allowing some disturbances that are beneficial for meeting a robustness objective; and creating new cells to accommodate practitioners that could not be absorbed in the existing cells.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A computer implemented method comprising:
 a processor creating a model of an existing shared service delivery system;
 the processor defining a capacity of the existing shared service delivery system according to required resources for existing projects, new projects, and proposed projects;

the processor identifying existing cells of practitioners in the existing shared service delivery system;

the processor identifying any gaps or gluts in capacity in the existing cells of practitioners according to a general predetermined resource requirement for the shared service delivery system;

the processor, in response to identifying a gap of capacity in the existing cells of practitioners, transmitting a first message to a manager recommending a creation of a new cell of practitioners according to a skill set demanded by the gap of capacity; and the processor recommending an assignment of practitioners to a particular cell of practitioners by utilizing a constraint of $f(\theta)=\Sigma w(e)/|E|$, $e \epsilon E$, where E denote edges in a subgraph formed by practitioners in the particular cell of practitioners $\theta$, $w(e)$ is a weight of e where $e \epsilon E$, and $f(\theta)$ is a familiarity index of the particular cell of practitioners, and wherein the familiarity index is defined as an average number of times that each member of the particular cell of practitioners has worked with another member of the particular cell of practitioners.

2. The computer implemented method of claim 1, further comprising:

the processor, in response to identifying a glut of capacity in the existing cells of practitioners, transmitting a second message to the manager recommending an update to the existing cells of practitioners by reallocating excess practitioners away from existing cells having the glut of capacity.

3. The computer implemented method of claim 1, further comprising:

the processor identifying practitioners that are eligible to create the new cell of practitioners from a bench of idle practitioners, wherein selected practitioners have all skills needed to meet a project-specific resource requirement for the shared service delivery system for a particular project.

4. The computer implemented method of claim 3, further comprising:

the processor, in response to determining that no practitioners from the bench of idle practitioners have all skills needed to meet the project-specific resource requirement, ignoring the project-specific resource requirement and identifying other practitioners from the bench to fill the new cell of practitioners, wherein the other practitioners still meet the general predetermined resource requirement for the shared service delivery system.

5. The computer implemented method of claim 1, further comprising:

the processor, in response to determining that each of two sub-cells of practitioners, having a same skill set required to meet a gap in resources, is individually incapable of meeting the predetermined resource requirement for the shared service delivery system, transmitting a recommendation to the manager to combine the two sub-cells of practitioners into a full cell of practitioners that meets the general predetermined resource requirement for the shared service delivery system.

6. The computer implemented method of claim 1, further comprising:

the processor, in response to determining that a particular cell of practitioners is individually incapable of meeting the general predetermined resource requirement for the shared service delivery system, transmitting a recommendation to the manager to transfer a practitioner from another cell to the particular cell of practitioners in order to create an optimized single cell that meets the general predetermined resource requirement for the shared service delivery system.

7. A computer program product comprising:

a non-transitory computer readable storage media;

first program instructions to create a model of an existing shared service delivery system;

second program instructions to define a capacity of the existing shared service delivery system according to required resources for existing projects, new projects, and proposed projects;

third program instructions to identify existing cells of practitioners in the existing shared service delivery system;

fourth program instructions to identify any gaps or gluts in capacity in the existing cells of practitioners according to a general predetermined resource requirement for the shared service delivery system;

fifth program instructions to, in response to identifying a gap of capacity in the existing cells of practitioners, transmit a first message to a manager recommending a creation of a new cell of practitioners according to a skill set demanded by the gap of capacity;

sixth program instructions to, in response to identifying a glut of capacity in the existing cells of practitioners, transmit a second message to the manager recommending an update to the existing cells of practitioners by reallocating excess practitioners away from existing cells having the glut of capacity; and seventh program instructions to recommend an assignment of practitioners to a particular cell of practitioners by utilizing a constraint of $f(\theta)=\Sigma w(e)/|E|$, $e \epsilon E$, where E denote edges in a subgraph formed by practitioners in the particular cell of practitioners $\theta$, $w(e)$ is a weight of e where $e \epsilon E$, and $f(\theta)$ is a familiarity index of the particular cell of practitioners, and wherein the familiarity index is defined as an average number of times that each member of the particular cell of practitioners has worked with another member of the particular cell of practitioners; and wherein the first, second, third, fourth, fifth, sixth, and seventh program instructions are stored on the non-transitory computer readable storage media.

8. The computer program product of claim 7, further comprising:

eighth program instructions to identify practitioners that are eligible to create the new cell of practitioners from a bench of idle practitioners, wherein selected practitioners have all skills needed to meet a project-specific resource requirement for the shared service delivery system for a particular project; and wherein the eighth program instructions are stored on the non-transitory computer readable storage media.

9. The computer program product of claim 8, further comprising:

ninth program instructions to, in response to determining that no practitioners from the bench of idle practitioners have all skills needed to meet the project-specific resource requirement, ignore the project-specific resource requirement and identify other practitioners from the bench to fill the new cell of practitioners, wherein the other practitioners still meet the general predetermined resource requirement for the shared service delivery system; and wherein the ninth program instructions are stored on the non-transitory computer readable storage media.

10. The computer program product of claim 7, further comprising:
eighth program instructions to, in response to determining that each of two sub-cells of practitioners, having a same skill set required to meet a gap in resources, is individually incapable of meeting the predetermined resource requirement for the shared service delivery system, transmit a recommendation to the manager to combine the two sub-cells of practitioners into a full cell of practitioners that meets the general predetermined resource requirement for the shared service delivery system; and wherein the eighth program instructions are stored on the non-transitory computer readable storage media.

11. The computer program product of claim 7, further comprising:
eighth program instructions to, in response to determining that a particular cell of practitioners is individually incapable of meeting the general predetermined resource requirement for the shared service delivery system, transmit a recommendation to the manager to transfer a practitioner from another cell to the particular cell of practitioners in order to create an optimized single cell that meets the general predetermined resource requirement for the shared service delivery system; and wherein the eighth program instructions are stored on the non-transitory computer readable storage media.

12. A computer system comprising:
a central processing unit (CPU), a non-transitory computer readable memory, and a non-transitory computer readable storage media;
first program instructions to create a model of an existing shared service delivery system;
second program instructions to define a capacity of the existing shared service delivery system according to required resources for existing projects, new projects, and proposed projects;
third program instructions to identify existing cells of practitioners in the existing shared service delivery system;
fourth program instructions to identify any gaps or gluts in capacity in the existing cells of practitioners according to a general predetermined resource requirement for the shared service delivery system;
fifth program instructions to, in response to identifying a gap of capacity in the existing cells of practitioners, transmit a first message to a manager recommending a creation of a new cell of practitioners according to a skill set demanded by the gap of capacity;
sixth program instructions to, in response to identifying a glut of capacity in the existing cells of practitioners, transmit a second message to the manager recommending an update to the existing cells of practitioners by reallocating excess practitioners away from existing cells having the glut of capacity; and
seventh program instructions to recommend an assignment of practitioners to a particular cell of practitioners by utilizing a constraint of $f(\theta)=\Sigma w(e)/|E|$, $e \in E$, where E denote edges in a subgraph formed by practitioners in the particular cell of practitioners $\theta$, $w(e)$ is a weight of e where $e \in E$, and $f(\theta)$ is a familiarity index of the particular cell of practitioners, and wherein the familiarity index is defined as an average number of times that each member of the particular cell of practitioners has worked with another member of the particular cell of practitioners; and wherein
the first, second, third, fourth, fifth, sixth, and seventh program instructions are stored on the non-transitory computer readable storage media for execution by the CPU via the non-transitory computer readable memory.

13. The computer system of claim 12, further comprising:
eighth program instructions to identify practitioners that are eligible to create the new cell of practitioners from a bench of idle practitioners, wherein selected practitioners have all skills needed to meet a project-specific resource requirement for the shared service delivery system for a particular project; and wherein the eighth program instructions are stored on the non-transitory computer readable storage media for execution by the CPU via the non-transitory computer readable memory.

14. The computer system of claim 13, further comprising:
ninth program instructions to, in response to determining that no practitioners from the bench of idle practitioners have all skills needed to meet the project-specific resource requirement, ignore the project-specific resource requirement and identify other practitioners from the bench to fill the new cell of practitioners, wherein the other practitioners still meet the general predetermined resource requirement for the shared service delivery system; and wherein
the ninth program instructions are stored on the computer readable storage media for execution by the CPU via the non-transitory computer readable memory.

15. The computer system of claim 12, further comprising:
eighth program instructions to, in response to determining that each of two sub-cells of practitioners, having a same skill set required to meet a gap in resources, is individually incapable of meeting the predetermined resource requirement for the shared service delivery system, transmit a recommendation to the manager to combine the two sub-cells of practitioners into a full cell of practitioners that meets the general predetermined resource requirement for the shared service delivery system; and wherein the eighth program instructions are stored on the non-transitory computer readable storage media for execution by the CPU via the non-transitory computer readable memory.

16. The computer system of claim 12, further comprising:
eighth program instructions to, in response to determining that a particular cell of practitioners is individually incapable of meeting the general predetermined resource requirement for the shared service delivery system, transmit a recommendation to the manager to transfer a practitioner from another cell to the particular cell of practitioners in order to create an optimized single cell that meets the general predetermined resource requirement for the shared service delivery system; and wherein the eighth program instructions are stored on the non-transitory computer readable storage media for execution by the CPU via the non-transitory computer readable memory.

* * * * *